(12) United States Patent
Moore et al.

(10) Patent No.: US 11,445,353 B1
(45) Date of Patent: Sep. 13, 2022

(54) MESSAGE TRANSMISSION ASSEMBLY

(71) Applicants: Scottie Moore, Moberly, MO (US); Renee N. Moore, Moberly, MO (US)

(72) Inventors: Scottie Moore, Moberly, MO (US); Renee N. Moore, Moberly, MO (US)

( * ) Notice: Subject to any disclaimer, the term of this patent is extended or adjusted under 35 U.S.C. 154(b) by 0 days.

(21) Appl. No.: 17/235,457

(22) Filed: Apr. 20, 2021

(51) Int. Cl.
*H04W 4/90* (2018.01)
*H04B 7/185* (2006.01)
*H04W 4/029* (2018.01)

(52) U.S. Cl.
CPC .......... *H04W 4/90* (2018.02); *H04B 7/18504* (2013.01); *H04W 4/029* (2018.02)

(58) Field of Classification Search
CPC ..... H04W 4/90; H04W 4/029; H04B 7/18504
USPC ...................................................... 455/404.2
See application file for complete search history.

(56) References Cited

U.S. PATENT DOCUMENTS

| | | | |
|---|---|---|---|
| 3,676,779 A | 7/1972 | Faulring | |
| 4,872,414 A | 10/1989 | Asquith | |
| 6,195,039 B1 | 2/2001 | Glass, Jr. | |
| 7,394,384 B2 | 7/2008 | Rainczuk | |
| 7,762,495 B2 | 7/2010 | Miller | |
| 9,619,977 B2 | 4/2017 | Graham | |
| D798,192 S | 9/2017 | Zhang | |
| 2017/0251096 A1* | 8/2017 | Koepke | .................. B64D 45/00 |
| 2021/0153001 A1* | 5/2021 | Eisner | ..................... H04L 67/56 |

* cited by examiner

*Primary Examiner* — Ted M Wang

(57) ABSTRACT

A message transmission assembly includes an unmanned aerial vehicle that has flight capabilities. A communication unit is integrated into the unmanned aerial vehicle and the communication unit receives a communication signal from an extrinsic communication network. The communication unit broadcasts an emergency signal when the communication unit receives the communication signal to alert emergency responders to an emergency. A location unit is integrated into the unmanned aerial vehicle and the location unit receives the physical location of the unmanned aerial vehicle from a global positioning system. Additionally, the location unit communicates the physical location of the unmanned aerial vehicle to the communication unit to communicate the physical location of the unmanned aerial vehicle to the emergency responders.

10 Claims, 7 Drawing Sheets

MESSAGE TRANSMISSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to message devices and more particularly pertains to a new message device for requesting emergency assistance in an area with limited cellular phone signal. The device includes an unmanned aerial vehicle that is programmed to fly to a predetermined altitude in order to receive adequate signal from a cellular phone tower. Additionally, the unmanned aerial vehicle broadcasts an assistance request to emergency responders that includes the physical location of the unmanned aerial vehicle.

(2) Description of Related Art Including Information Disclosed Under 37 CFR 1.97 and 1.98

The prior art relates to message devices including a variety of aerial messaging devices that each includes a balloon that floats to a predetermined altitude and which includes a transmitter for broadcasting a request for emergency assistance. In no instance does the prior art disclose an aerial messaging device that includes an unmanned aerial vehicle which is programmed to follow a predetermined flight path and which broadcasts a request for emergency assistance to a cellular phone tower.

BRIEF SUMMARY OF THE INVENTION

An embodiment of the disclosure meets the needs presented above by generally comprising an unmanned aerial vehicle that has flight capabilities. A communication unit is integrated into the unmanned aerial vehicle and the communication unit receives a communication signal from an extrinsic communication network. The communication unit broadcasts an emergency signal when the communication unit receives the communication signal to alert emergency responders to an emergency. A location unit is integrated into the unmanned aerial vehicle and the location unit receives the physical location of the unmanned aerial vehicle from a global positioning system. Additionally, the location unit communicates the physical location of the unmanned aerial vehicle to the communication unit to communicate the physical location of the unmanned aerial vehicle to the emergency responders.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
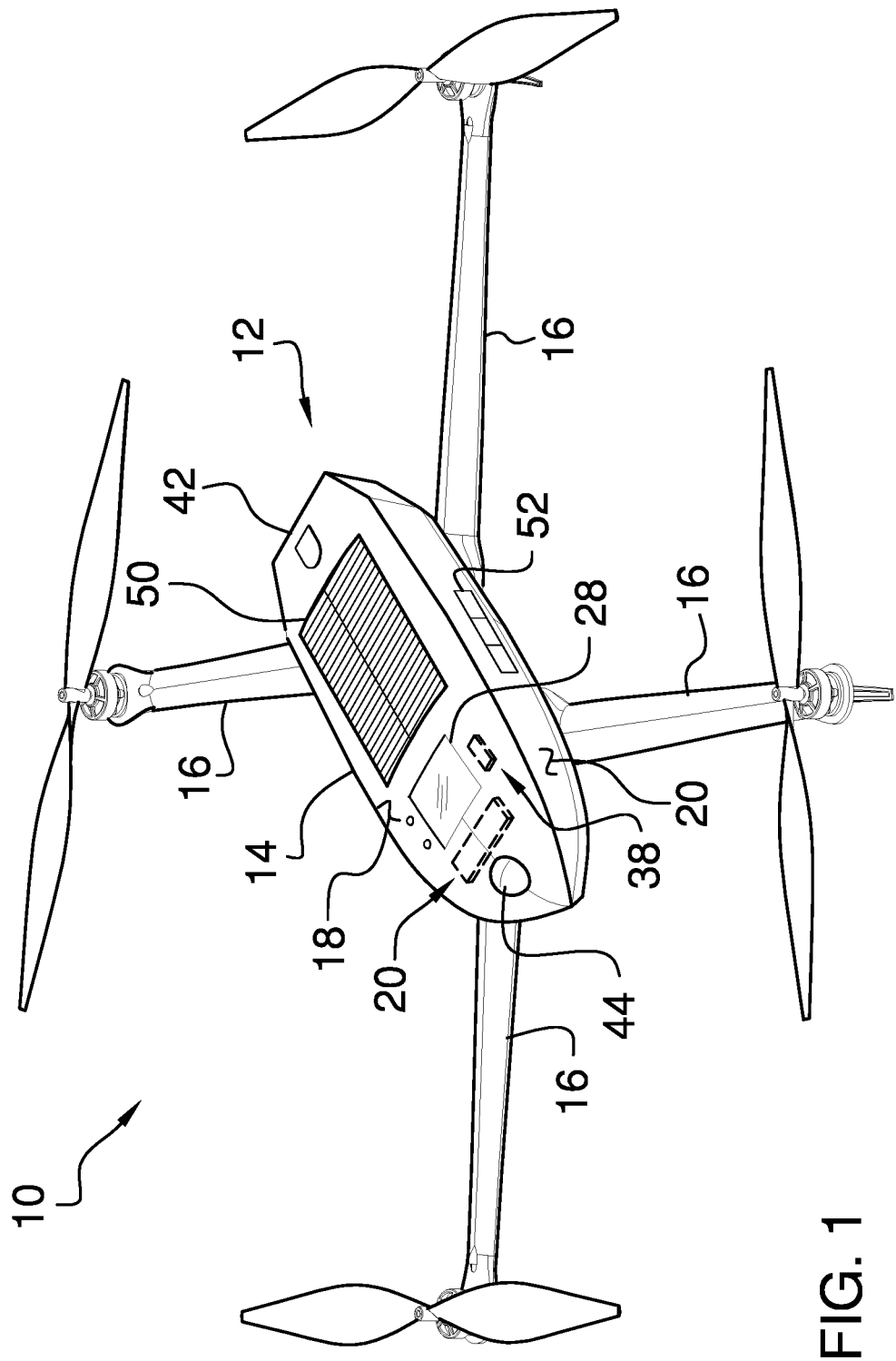
FIG. 1 is a top perspective view of a message transmission assembly according to an embodiment of the disclosure.
Figure 2:
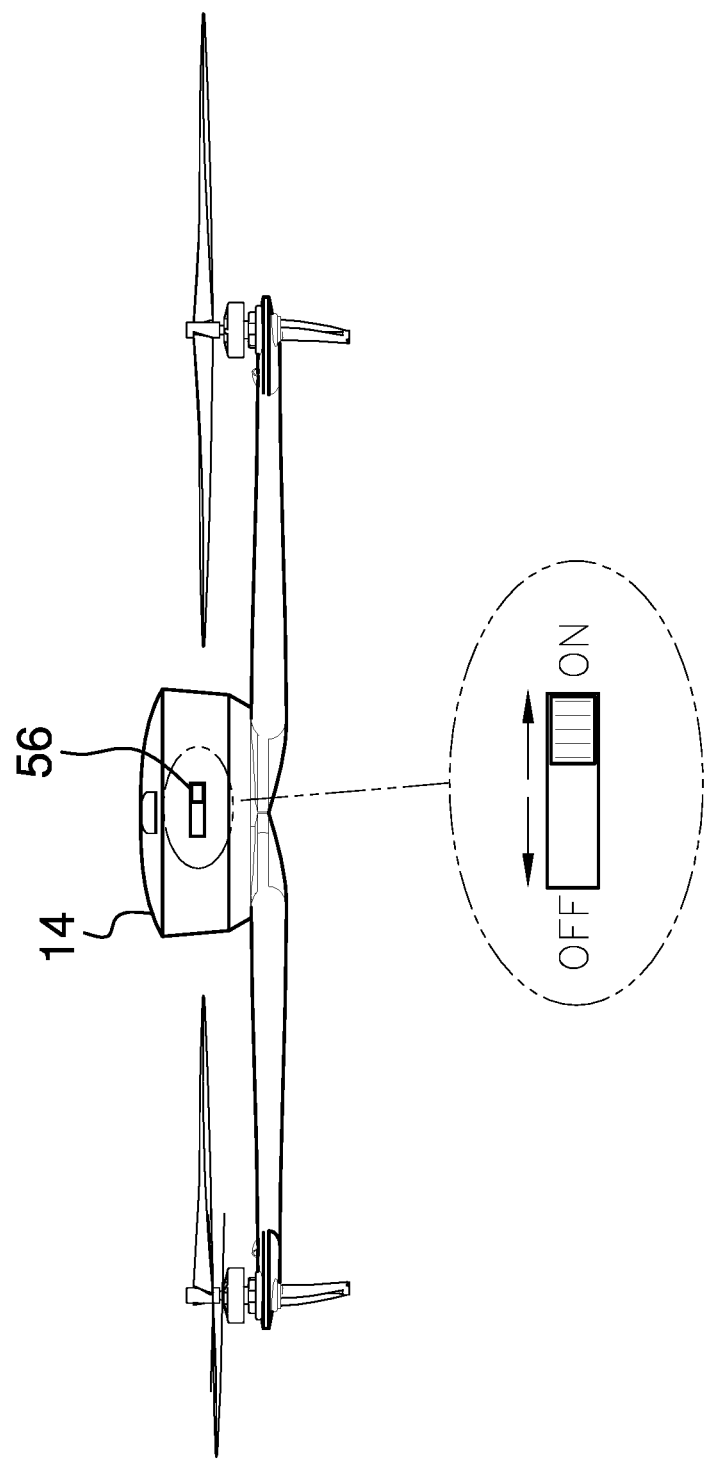
FIG. 2 is a back view of an embodiment of the disclosure.
Figure 3:
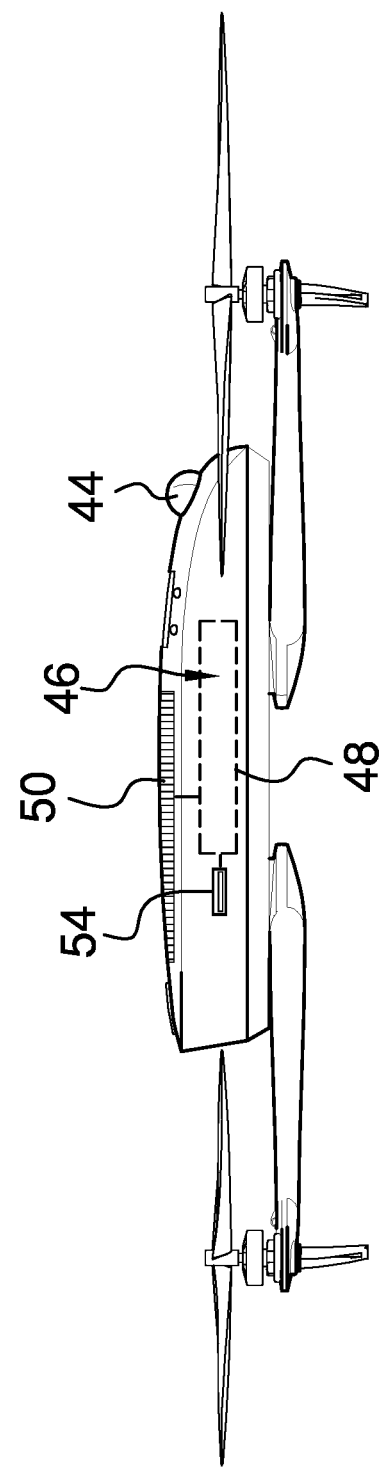
FIG. 3 is a right side view of an embodiment of the disclosure.
Figure 4:
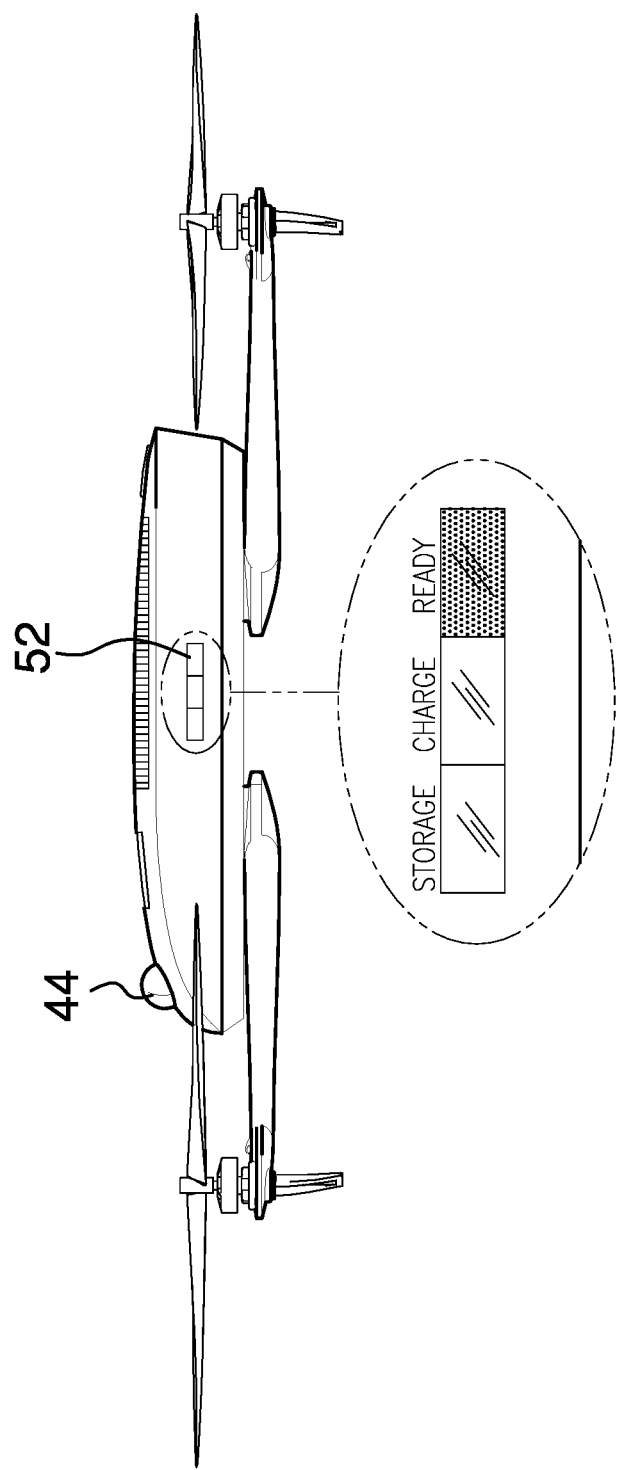
FIG. 4 is a left side view of an embodiment of the disclosure.
Figure 5:
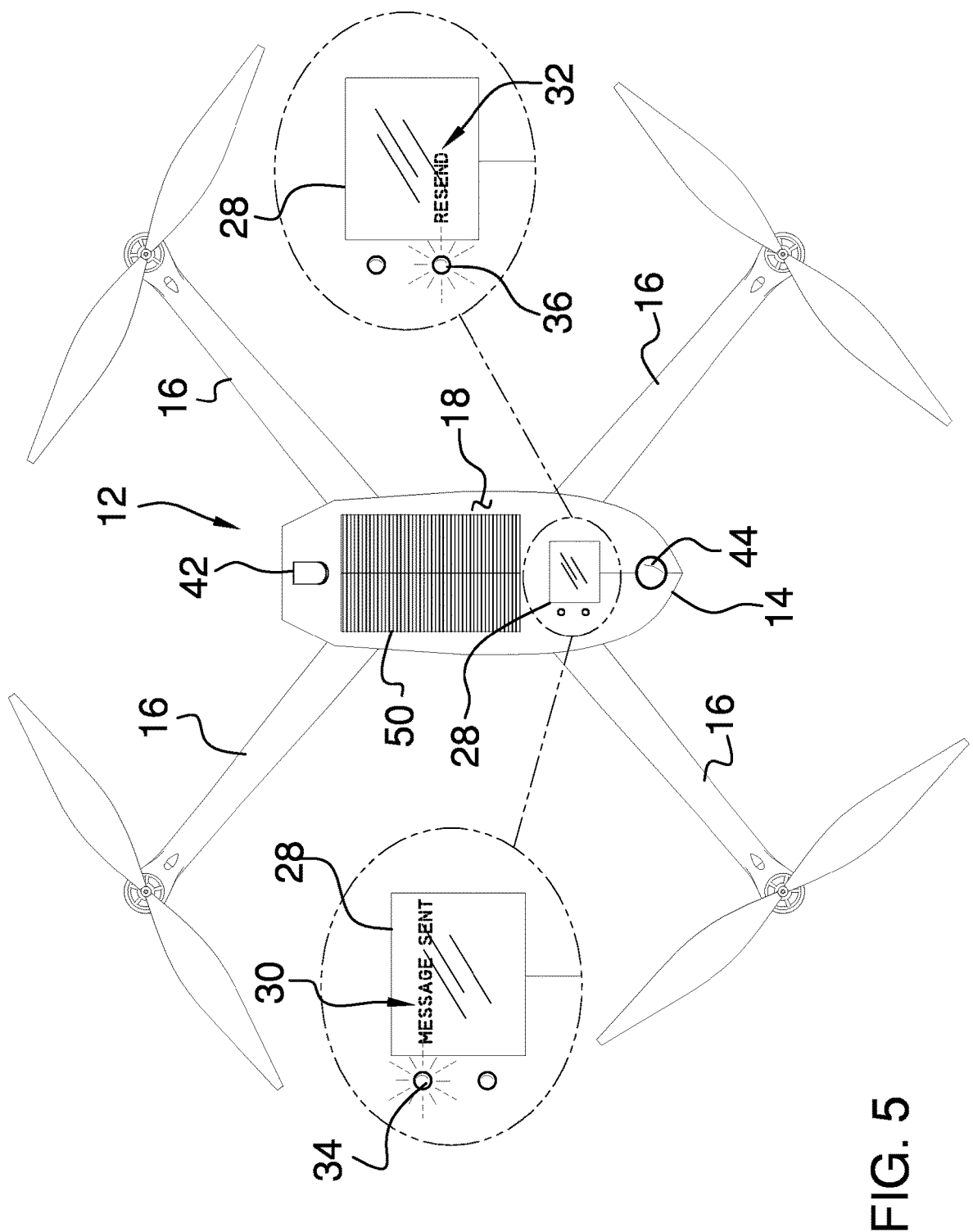
FIG. 5 is a top view of an embodiment of the disclosure.
Figure 6:
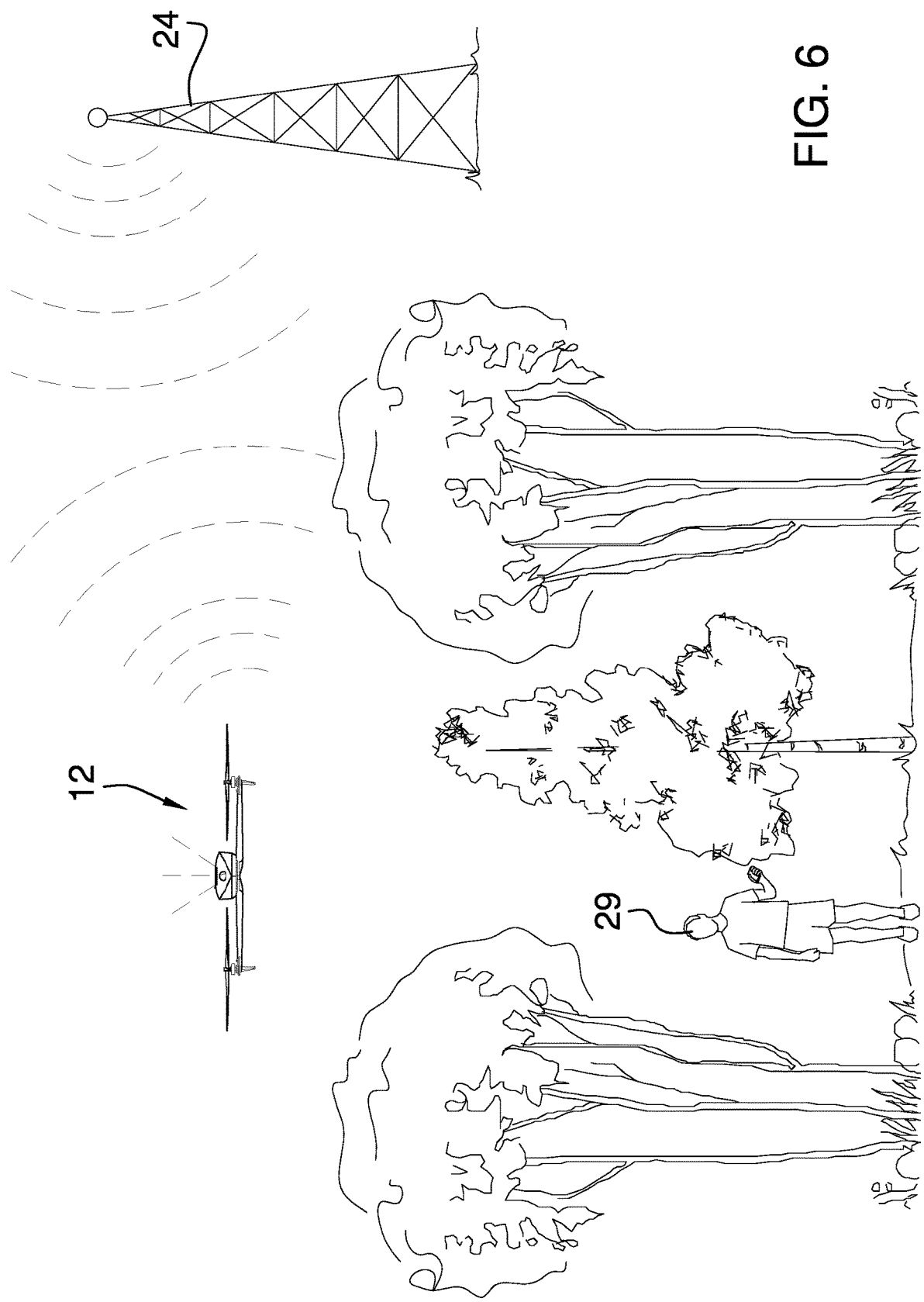
FIG. 6 is a perspective in-use view of an embodiment of the disclosure.
Figure 7:
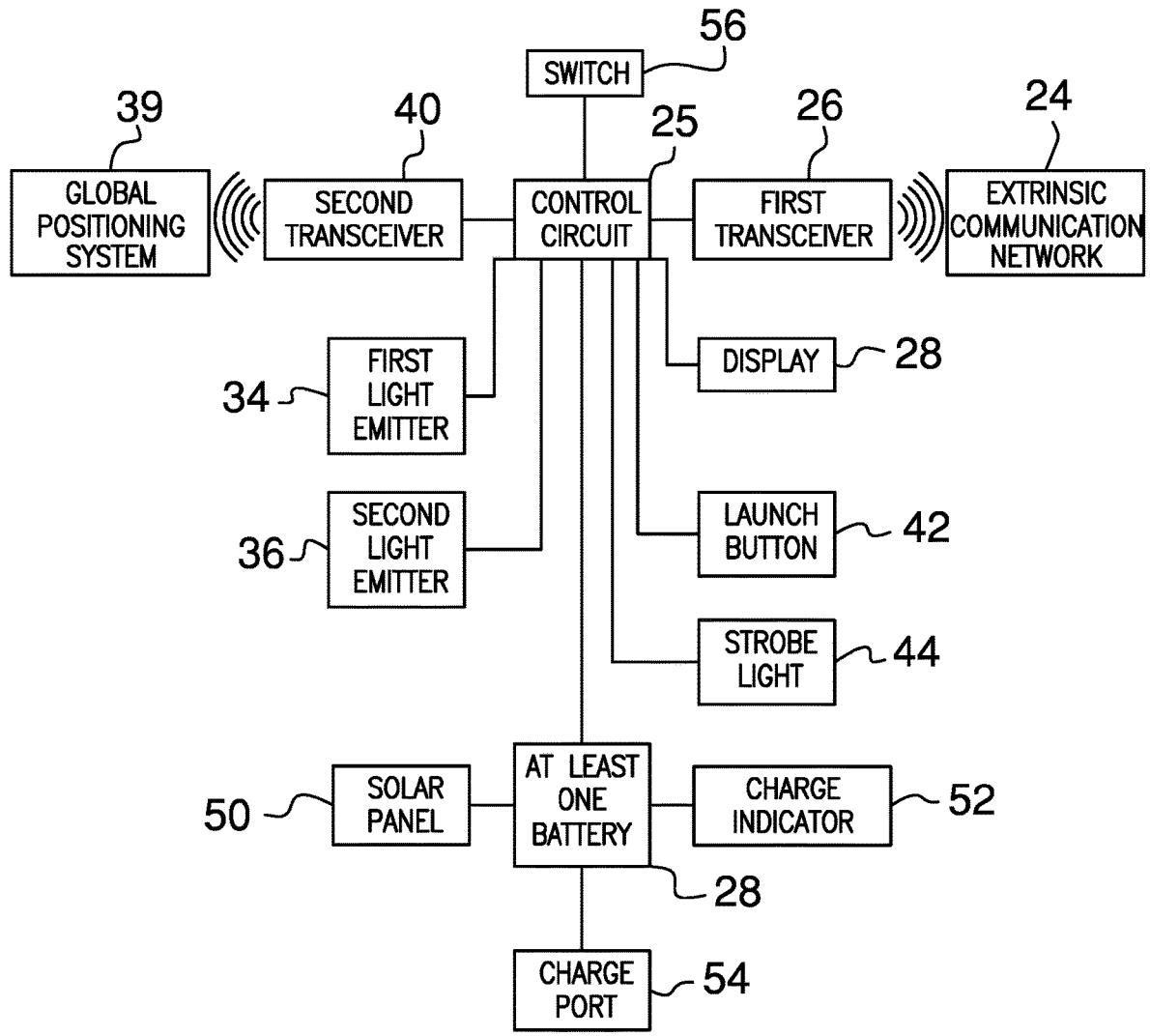
FIG. 7 is a schematic view of an embodiment of the disclosure.

With reference now to the drawings, and in particular to FIGS. 1 through 7 thereof, a new message device embodying the principles and concepts of an embodiment of the disclosure and generally designated by the reference numeral 10 will be described.

As best illustrated in FIGS. 1 through 7, the message transmission assembly 10 generally comprises an unmanned aerial vehicle 12 that has flight capabilities such that the unmanned aerial vehicle 12 can fly at a predetermined altitude. The unmanned aerial vehicle 12 has a fuselage 14 and a plurality of propulsion units 16 each being coupled to the fuselage 14. The fuselage 14 has a top surface 18 and a perimeter surface 20, each of the propulsion units 16 is coupled to and extends away from the perimeter surface 20 and the propulsion units 16 is distributed around the fuselage 14. The unmanned aerial vehicle 12 may comprise an aerial drone and each of the propulsion units 16 might include an electric motor and a propeller coupled to the electric motor. Additionally, the unmanned aerial vehicle 12 may include flight control circuitry that is common to aerial drones.

A communication unit 22 is integrated into the unmanned aerial vehicle 12 and the communication unit 22 has signal reception capabilities thereby facilitating the communication unit 22 to receive a communication signal. In this way the communication unit 22 can be in wireless communication with an extrinsic communication network 24 when the unmanned aerial vehicle 12 is flown at the predetermined altitude. The communication unit 22 broadcasts an emergency signal when the communication unit 22 receives the communication signal. In this way the communication unit 22 can alert emergency responders to an emergency. The extrinsic communication network 24 may be a cellular phone network which may include signal transmission towers.

The communication unit 22 comprises a control circuit 25 that is integrated into the fuselage 14. The control circuit 25 receives a successful connection input. Additionally, the control circuit 25 receives a failed connection input. The control circuit 25 is electrically coupled to each of the propulsion units 16.

The communication unit 22 includes a first transceiver 26 that is integrated into the fuselage 14 for receiving the communication signal from the extrinsic communication network 24. The control circuit 25 receives the successful connection input when the first transceiver 26 receives the communication signal. Conversely, the control circuit 25 receives the failed connection input when the first transceiver 26 fails to receive the communication signal. The first transceiver 26 broadcasts the emergency signal when the control circuit 25 receives the successful connection input. The first transceiver 26 may comprise a radio frequency transceiver or the like that is capable of long range communication with cellular phone towers.

The communication unit 22 includes a display 28 that is coupled to the top surface 18 of the fuselage 14 such that the display 28 is visible to a user 29. The display 28 is electrically coupled to the control circuit 25 and the display 28 displays sent indicia 30 when the control circuit 25 receives the successful connection input. In this way the display 28 can communicate to the user 29 that the emergency responders have been contacted. Additionally, the display 28 displays not sent indicia 32 when the control circuit 25 receives the failed connection input. In this way the display 28 can communicate to the user 29 that the emergency responders were not contacted. The display 28 may comprise a liquid crystal display 28 or other type of electronic display 28. The sent indicia 30 may comprise the words "message sent" and the not sent indicia 32 may comprise the word "resend".

The communication unit 22 includes a first light emitter 34 that is coupled to the top surface 18 of the fuselage 14 and the first light emitter 34 emits light outwardly therefrom. The first light emitter 34 is electrically coupled to the control circuit 25 and the first light emitter 34 is turned on when the control circuit 25 receives the successful connection input. In this way the first light emitter 34 can visually communicate to the user 29 that the emergency responders have been contacted. The first light emitter 34 may comprise a light emitting diode and the first light emitter 34 may emit light of a green color.

The communication unit 22 includes a second light emitter 36 that is coupled to the top surface 18 of the fuselage 14 and the second light emitter 36 emits light outwardly therefrom. The second light emitter 36 is electrically coupled to the control circuit 25 and the second light emitter 36 is turned on when the control circuit 25 receives the failed connection input. In this way the second light emitter 36 can visually communicate to the user 29 that the emergency responders have not been contacted. The second light emitter 36 may comprise a light emitting diode or the like and the second light emitter 36 may emit light of a red color.

A location unit 38 is provided and the location unit 38 is integrated into the unmanned aerial vehicle 12. The location unit 38 is in wireless communication with a global positioning system 39 to facilitate the location unit 38 to receive the physical location of the unmanned aerial vehicle 12 when the unmanned aerial vehicle 12 is launched. Moreover, the location unit 38 communicates the physical location of the unmanned aerial vehicle 12 to the communication unit 22. In this way the communication unit 22 can communicate the physical location of the unmanned aerial vehicle 12 to the emergency responders thereby facilitating the emergency responders to locate the user 29.

The location unit 38 comprises a second transceiver 40 that is integrated into the fuselage 14 and the second transceiver 40 is electrically coupled to the control circuit 25. The second transceiver 40 is in wireless communication with the global positioning system 39. Additionally, the second transceiver 40 communicates the physical location of the unmanned aerial vehicle 12 to the control circuit 25 when the control circuit 25 receives the successful connection input. In this way the first transceiver 26 can communicate the physical location to the emergency responders.

The control circuit 25 actuates each of the propulsion units 16 to guide the unmanned aerial vehicle 12 in a continually expanding spiral with respect to the physical location of the launch site of the unmanned aerial vehicle 12 until the control circuit 25 receives the successful connection input. Additionally, the control circuit 25 actuates each of the propulsion units 16 to guide the unmanned aerial vehicle 12 back to the launch site when the control circuit 25 receives the failed connection input after a pre-determined duration of time has passed. The control circuit 25 additionally actuates each of the propulsion units 16 to guide the unmanned aerial unit to an altitude that ensures the first transceiver 26 has the greatest possible chance of receiving the communication signal.

A launch button 42 is movably integrated into the fuselage 14 and the launch button 42 is electrically coupled to the control circuit 25. The control circuit 25 actuates each of the propulsion units 16 to fly the unmanned aerial vehicle 12 when the launch button 42 is depressed. A strobe light 44 is coupled to the fuselage 14 and the strobe light 44 emits light outwardly therefrom. The strobe light 44 is electrically coupled to the control circuit 25 and the strobe light 44 is turned on when the launch button 42 is depressed. In this way the strobe light 44 can enhance visibility of the unmanned aerial vehicle 12 when the unmanned aerial vehicle 12 is in flight. The strobe light 44 may comprise a light emitting diode or other type of electronic light emitter that repeatedly flashes on and off.

A power supply 46 is integrated into the unmanned aerial vehicle 12 and the power supply 46 is electrically coupled to the control circuit 25. The power supply 46 comprises at least one battery 48 that is positioned within the fuselage 14 and the power supply 46 is electrically coupled to the control circuit 25. The power supply 46 includes a solar panel 50 that is coupled to the top surface 18 of the fuselage 14 such that the solar panel 50 is exposed to sunlight. Moreover, the solar panel 50 is electrically coupled to the at least one battery 48 for charging the at least one battery 48.

The power supply 46 includes a charge indicator 52 that is coupled to the fuselage 14 such that the charge indicator 52 is visible to the user 29. The charge indicator 52 is electrically coupled to the at least one battery 48 and the charge indicator 52 indicates a charge of the at least one battery 48 ranging between a minimum charge and a maximum charge. The charge indicator 52 may comprise a light emitting diode or the like which is capable of emitting light of various colors that correlate to the level of charge of the at least one battery 48.

The power supply 46 includes a charge port 54 that is recessed into the fuselage 14 and the charge port 54 can receive a charge cord. The charge port 54 is electrically coupled to the at least one battery 48 for charging the at least one battery 48. The power supply 46 also includes a switch 56 that is slidably integrated into the fuselage 14 such that the switch 56 can be manipulated by the user 29. The switch 56 is electrically coupled to the control circuit 25 for turning the control circuit 25 on and off.

In use, the unmanned aerial vehicle 12 is launched when the user 29 is in a remote area that does not have adequate cellular phone signal to facilitate the user 29 to employ a cell phone to call for help. The unmanned aerial vehicle 12 ascends to a predetermined altitude to facilitate the communication unit 22 to communicate with the extrinsic communication network 24. Additionally, the location unit 38 receives the physical location of the unmanned aerial vehicle 12 when the unmanned aerial vehicle 12 is launched. The unmanned aerial vehicle 12 begins to fly in an ever expanding spiral with respect to the launch site until the communication unit 22 successfully communicates with the extrinsic communication network 24. Additionally, the communication unit 22 broadcasts a request for emergency assistance that includes the physical location of the unmanned aerial vehicle 12. The unmanned aerial vehicle 12 returns to the launch site when the communication unit 22 successfully broadcasts the request for emergency assistance or when the communication unit 22 fails to broadcast the request for emergency assistance after a predetermined duration of time. In this way the user 29 can request emergency assistance when the user 29 is in a remote location that would otherwise prohibit the user 29 from employing a cell phone to call for help.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A message transmission assembly for sending a message to emergency responders in an area with limited cellular communication signal, said assembly comprising:

an unmanned aerial vehicle having flight capabilities wherein said unmanned aerial vehicle is configured to fly at a predetermined altitude, said unmanned aerial vehicle having a fuselage and a plurality of propulsion units each being coupled to said fuselage;

a communication unit being integrated into said unmanned aerial vehicle, said communication unit having signal reception capabilities thereby facilitating said communication unit to receive a communication signal wherein said communication unit is configured to be in wireless communication with an extrinsic communication network when said unmanned aerial vehicle is flown at the predetermined altitude, said communication unit broadcasting an emergency signal when said communication unit receives the communication signal wherein said communication unit is configured to alert emergency responders to an emergency; and a location unit being integrated into said unmanned aerial vehicle, said location unit being in wireless communication with a global positioning system wherein said location unit is configured to receive the physical location of said unmanned aerial vehicle when said unmanned aerial vehicle is launched, said location unit communicating the physical location of said unmanned aerial vehicle to said communication unit wherein said communication unit is configured to communicate the physical location of said unmanned aerial vehicle to the emergency responders thereby facilitating the emergency responders to locate the user.

2. The assembly according to claim 1, wherein said communication unit comprises a control circuit being integrated into said fuselage, said control circuit receiving a successful connection input, said control circuit receiving a failed connection input, said control circuit being electrically coupled to each of said propulsion units.

3. The assembly according to claim 2, wherein said communication unit includes a first transceiver being integrated into said fuselage for receiving the communication signal from the extrinsic communication network, said control circuit receiving said successful connection input when said first transceiver receives the communication signal, said control circuit receiving said failed connection input when said first transceiver fails to receive the communication signal, said first transceiver broadcasting said emergency signal when said control circuit receives said successful connection input.

4. The assembly according to claim 2, wherein said communication unit includes a display being coupled to said top surface of said fuselage wherein said display is configured to be visible to a user, said display being electrically coupled to said control circuit, said display displaying sent indicia when said control circuit receives said successful connection input wherein said display is configured to communicate to the user that the emergency responders have been contacted, said display displaying not sent indicia when said control circuit receives said failed connection input wherein said display is configured to communicate to the user that the emergency responders were not contacted.

5. The assembly according to claim 2, wherein said communication unit includes a first light emitter being coupled to a top surface of said fuselage wherein said first light emitter is configured to emit light outwardly therefrom, said first light emitter being electrically coupled to said control circuit, said first light emitter being turned on when said control circuit receives said successful connection input wherein said first light emitter is configured to visually communicate to the user that the emergency responders have been contacted.

6. The assembly according to claim 5, wherein said communication unit includes a second light emitter being coupled to said top surface of said fuselage wherein said second light emitter is configured to emit light outwardly therefrom, said second light emitter being electrically coupled to said control circuit, said second light emitter being turned on when said control circuit receives said failed connection input wherein said second light emitter is configured to visually communicate to the user that the emergency responders have not been contacted.

7. The assembly according to claim 1, wherein:
said communication unit includes a first transceiver; and
said location unit comprises a second transceiver being integrated into said fuselage, said second transceiver being electrically coupled to said control circuit, said second transceiver being in wireless communication with the global positioning system, said second transceiver communicating the physical location of said unmanned aerial vehicle to said control circuit when said control circuit receives said successful connection input thereby facilitating said first transceiver to communicate the physical location to the emergency responders.

8. The assembly according to claim 7, wherein said control circuit actuates each of said propulsion units to guide said unmanned aerial vehicle in a continually expanding spiral with respect to the physical location of the launch site of said unmanned aerial vehicle until said control circuit receives said successful connection input, said control circuit actuating each of said propulsion units to guide said unmanned aerial vehicle back to the launch site when said control circuit receives said failed connection input after a pre-determined duration of time has passed.

9. The assembly according to claim 2, further comprising:
a launch button being movably integrated into said fuselage, said launch button being electrically coupled to said control circuit, said control circuit actuating each of said propulsion units to fly said unmanned aerial vehicle when said launch button is depressed;
a strobe light being coupled to said fuselage wherein said strobe light is configured to emit light outwardly therefrom, said strobe light being electrically coupled to said control circuit, said strobe light being turned on when said launch button is depressed wherein said strobe light is configured to enhance visibility of said unmanned aerial vehicle when said unmanned aerial vehicle is in flight; and
a power supply being integrated into said unmanned aerial vehicle, said power supply being electrically coupled to said control circuit, said power supply comprising:
at least one battery being positioned within said fuselage, said power supply being electrically coupled to said control circuit;
a solar panel being coupled to said top surface of said fuselage wherein said solar panel is configured to be exposed to sunlight, said solar panel being electrically coupled to said at least one battery for charging said at least one battery;
a charge indicator being coupled to said fuselage wherein said charge indicator is configured to be visible to the user, said charge indicator being electrically coupled to said at least one battery, said charge indicator indicating a charge of said at least one battery ranging between a minimum charge and a maximum charge;
a charge port being recessed into said fuselage wherein said charge port is configured to receive a charge cord, said charge port being electrically coupled to said at least one battery for charging said at least one battery; and
a switch being slidably integrated into said fuselage wherein said switch is configured to be manipulated by the user, said switch being electrically coupled to said control circuit for turning said control circuit on and off.

10. A message transmission assembly for sending a message to emergency responders in an area with limited cellular communication signal, said assembly comprising:
an unmanned aerial vehicle having flight capabilities wherein said unmanned aerial vehicle is configured to fly at a predetermined altitude, said unmanned aerial vehicle having a fuselage and a plurality of propulsion units each being coupled to said fuselage, said fuselage having a top surface and a perimeter surface, each of said propulsion units being coupled to and extending away from said perimeter surface, said propulsion units being distributed around said fuselage;
a communication unit being integrated into said unmanned aerial vehicle, said communication unit having signal reception capabilities thereby facilitating said communication unit to receive a communication signal wherein said communication unit is configured to be in wireless communication with an extrinsic communication network when said unmanned aerial vehicle is flown at the predetermined altitude, said communication unit broadcasting an emergency signal when said communication unit receives the communication signal wherein said communication unit is configured to alert emergency responders to an emergency, said communication unit comprising:
a control circuit being integrated into said fuselage, said control circuit receiving a successful connection input, said control circuit receiving a failed connection input, said control circuit being electrically coupled to each of said propulsion units;
a first transceiver being integrated into said fuselage for receiving the communication signal from the extrinsic communication network, said control circuit receiving said successful connection input when said first transceiver receives the communication signal, said control circuit receiving said failed connection input when said first transceiver fails to receive the communication signal, said first transceiver broadcasting said emergency signal when said control circuit receives said successful connection input;
a display being coupled to said top surface of said fuselage wherein said display is configured to be visible to a user, said display being electrically coupled to said control circuit, said display displaying sent indicia when said control circuit receives said successful connection input wherein said display is configured to communicate to the user that the emergency responders have been contacted, said display displaying not sent indicia when said control circuit receives said failed connection input wherein said display is configured to communicate to the user that the emergency responders were not contacted;
a first light emitter being coupled to said top surface of said fuselage wherein said first light emitter is configured to emit light outwardly therefrom, said first light emitter being electrically coupled to said control circuit, said first light emitter being turned on when said control circuit receives said successful connection input wherein said first light emitter is configured to visually communicate to the user that the emergency responders have been contacted; and a second light emitter being coupled to said top surface of said fuselage wherein said second light emitter is configured to emit light outwardly therefrom, said second light emitter being electrically coupled to said control circuit, said second light emitter being turned on when said control circuit receives said failed connection input wherein said second light emitter is configured to visually communicate to the user that the emergency responders have not been contacted;

a location unit being integrated into said unmanned aerial vehicle, said location unit being in wireless communication with a global positioning system wherein said location unit is configured to receive the physical location of said unmanned aerial vehicle when said unmanned aerial vehicle is launched, said location unit communicating the physical location of said unmanned aerial vehicle to said communication unit wherein said communication unit is configured to communicate the physical location of said unmanned aerial vehicle to the emergency responders thereby facilitating the emergency responders to locate the user, said location unit comprising a second transceiver being integrated into said fuselage, said second transceiver being electrically coupled to said control circuit, said second transceiver being in wireless communication with the global positioning system, said second transceiver communicating the physical location of said unmanned aerial vehicle to said control circuit when said control circuit receives said successful connection input thereby facilitating said first transceiver to communicate the physical location to the emergency responders, said control circuit actuating each of said propulsion units to guide said unmanned aerial vehicle in a continually expanding spiral with respect to the physical location of the launch site of said unmanned aerial vehicle until said control circuit receives said successful connection input, said control circuit actuating each of said propulsion units to guide said unmanned aerial vehicle back to the launch site when said control circuit receives said failed connection input after a pre-determined duration of time has passed;

a launch button being movably integrated into said fuselage, said launch button being electrically coupled to said control circuit, said control circuit actuating each of said propulsion units to fly said unmanned aerial vehicle when said launch button is depressed;

a strobe light being coupled to said fuselage wherein said strobe light is configured to emit light outwardly therefrom, said strobe light being electrically coupled to said control circuit, said strobe light being turned on when said launch button is depressed wherein said strobe light is configured to enhance visibility of said unmanned aerial vehicle when said unmanned aerial vehicle is in flight; and a power supply being integrated into said unmanned aerial vehicle, said power supply being electrically coupled to said control circuit, said power supply comprising:

at least one battery being positioned within said fuselage, said power supply being electrically coupled to said control circuit;

a solar panel being coupled to said top surface of said fuselage wherein said solar panel is configured to be exposed to sunlight, said solar panel being electrically coupled to said at least one battery for charging said at least one battery;

a charge indicator being coupled to said fuselage wherein said charge indicator is configured to be visible to the user, said charge indicator being electrically coupled to said at least one battery, said charge indicator indicating a charge of said at least one battery ranging between a minimum charge and a maximum charge;

a charge port being recessed into said fuselage wherein said charge port is configured to receive a charge cord, said charge port being electrically coupled to said at least one battery for charging said at least one battery; and a switch being slidably integrated into said fuselage wherein said switch is configured to be manipulated by the user, said switch being electrically coupled to said control circuit for turning said control circuit on and off.

* * * * *